ced by examiner

United States Patent
Sandstrom

(10) Patent No.: US 7,247,669 B2
(45) Date of Patent: Jul. 24, 2007

(54) RUBBER PREPARED WITH PRECIPITATED SILICA AND CARBON BLACK PELLET COMPOSITES OF CONTROLLED HARDNESS AND TIRE WITH COMPONENT DERIVED THEREFROM

(75) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 50 days.

(21) Appl. No.: 11/202,044

(22) Filed: Aug. 11, 2005

(65) Prior Publication Data

US 2007/0037917 A1     Feb. 15, 2007

(51) Int. Cl.
*C08K 3/34*     (2006.01)
*C08L 9/00*     (2006.01)

(52) U.S. Cl. ............. 524/492; 524/495; 524/493; 524/494; 524/571; 524/575; 152/209.11; 152/192; 152/209.1; 152/525; 152/524

(58) Field of Classification Search ............ 524/492, 524/495, 493, 494, 571, 575, 7.2; 152/209.11, 152/192, 209.1, 525, 524
See application file for complete search history.

(56) References Cited

U.S. PATENT DOCUMENTS

| | | | |
|---|---|---|---|
| 6,172,137 B1 * | 1/2001 | Agostini et al. | 523/212 |
| 6,761,198 B2 * | 7/2004 | Zanzig et al. | 152/209.5 |
| 6,838,511 B2 * | 1/2005 | Zanzig | 524/492 |

\* cited by examiner

*Primary Examiner*—Ling-Sui Choi
(74) *Attorney, Agent, or Firm*—Henry C. Young, Jr.

(57) ABSTRACT

This invention relates to a rubber composition prepared with reinforcement comprised of a combination of precipitated silica aggregates and pelletized rubber reinforcing carbon black composites of carbon black and organic binder of a controlled hardness and to a tire with at least one component comprised of and derived from such rubber composition in which said carbon black pellet composites are disintegrated (fragmented) in situ within said rubber composition in the presence of particulate precipitated silica and silica coupling agent. In one aspect the invention relates to a tire having a component of a rubber composition comprised of at least one conjugated diene-based elastomer and reinforcing filler comprised of a combination of precipitated silica, silica coupling agent and fragmented rubber reinforcing carbon black pellet composites, said pellets having a controlled hardness value.

2 Claims, No Drawings

RUBBER PREPARED WITH PRECIPITATED SILICA AND CARBON BLACK PELLET COMPOSITES OF CONTROLLED HARDNESS AND TIRE WITH COMPONENT DERIVED THEREFROM

FIELD OF THE INVENTION

This invention relates to a rubber composition prepared with reinforcement comprised of a combination of precipitated silica aggregates and pelletized rubber reinforcing carbon black composites of carbon black and organic binder of a controlled hardness and to a tire with at least one component comprised of and derived from such rubber composition in which said carbon black pellet composites are disintegrated (fragmented) in situ within said rubber composition in the presence of particulate precipitated silica and silica coupling agent. In one aspect the invention relates to a tire having a component of a rubber composition comprised of at least one conjugated diene-based elastomer and reinforcing filler comprised of a combination of precipitated silica, silica coupling agent and fragmented rubber reinforcing carbon black pellet composites, said pellets having a controlled hardness value.

BACKGROUND OF THE INVENTION

Particulate rubber reinforcing carbon black is often used to reinforce various rubber compositions. In practice, a particulate carbon black is first formed into pellets comprised of the carbon black and binder to facilitate handling of the carbon black and particularly to reduce carbon dust in the rubber product manufacturing facility. The carbon black pellets are then blended with the rubber composition. As the rubber composition is being mixed under high shear conditions, the carbon black pellets disintegrate, into particulate rubber carbon black reinforcement within the rubber composition. Such use of pelletized rubber reinforcing carbon black for preparation of various rubber compositions is well known to those having skill in such art.

In practice, rubber reinforcing carbon black may be manufactured, for example, by forming fumed carbon black under controlled conditions at a significantly elevated temperature to form carbon black in a form of fine carbon black aggregates comprised of primary carbon black particles fused together in an uncompacted form of very small particle size which, while having a specific gravity in a range of from about 1.6 to about 1.9, depending upon the carbon black grade, but because the carbon black aggregates are separated by a significant amount of empty space (voids), they typically have a very low apparent density in a range, for example, from about 100 to about 250 $kg/m^3$, and have an appearance of being relatively fluffy in nature and are therefore referred to herein as being "fluffy".

The fluffy, fine particle sized carbon black aggregates are typically very dusty in nature and present associated handling problems in an industrial environment for manufacturing carbon black reinforced rubber products.

Accordingly, in order to make such fluffy carbon black aggregates transportable and useable in a form of a relatively non-dusting material, binder materials are conventionally used to glue the particulate carbon black aggregates together and to therefore significantly reduce the amount of empty space between the carbon black aggregates. The resulting composite of carbon black aggregates and binder material is typically pelletized to form pellets of the carbon black to promote the transportability of the composite. The apparent density of the carbon back aggregates may thereby be increased to perhaps an apparent density in a range, for example, of about 270 to about 600 $kg/m^3$, depending somewhat upon the choice of carbon black type and binder material, because the voids between the carbon black aggregates are filled with the binder material.

The binder material physically interacts with the surface of the carbon black aggregates, binds the carbon black aggregates together and promotes a degree of hardness to the pellets.

In practice, such binder materials are typically organic material binders such as for example, molasses, soluble cellulose, methyl cellulose and soluble starch materials.

Intuitively, it is necessary that the composites of carbon black pellets are fragmented, or disintegrated, during high shear mixing of rubber compositions, to form the particulate fragmented carbon black reinforcement filler in situ within the elastomer host.

The efficiency of such fragmentation, or disintegration, of such carbon black pellet composites in situ within the elastomer host in the presence of a particulate precipitated silica and silica coupling agent is considered herein to be important to provide an appropriate high degree of dispersion of the carbon black fragments within the rubber composition to promote various appropriate physical properties of the rubber composition such as, for example, abrasion resistance and also sometimes tear resistance of the vulcanized rubber composition.

It is considered herein that the hardness of the carbon black pellets plays a role in such fragmentation, or disintegration, efficiency and resultant promotion of physical properties of the rubber composition, particularly for various components of a rubber tire such as, for example, a tire tread.

While the mechanism may not be completely understood, it appears that the hardness value of the pelletized rubber reinforcing carbon black composites is important where the reinforcing filler for the rubber composition is a combination of the fragmented rubber reinforcing carbon black and precipitated silica together with a silica coupling agent. Such phenomenon may be perhaps due, for example, to some kind of interaction, or quasi interaction, between the process of disintegration, or fragmentation, of the carbon black pellets in which their hardness value plays a part in the presence of the particulate precipitated silica and silica coupling agent which is preferentially reactive with hydroxyl groups on the precipitated silica, all in situ within the elastomer host or, alternatively or in combination, some kind of phase relationship or perhaps some kind of preferential affinity within the elastomer host of the elastomer for the fragmentation of the carbon black pellets in the presence of the particulate precipitated silica and silica coupling agent, in which the hardness of the carbon black pellets plays some kind of a roll in the efficiency of providing carbon black fragments, particularly where a good dispersion of the carbon black fragments within the elastomer host is desired.

Further, in another aspect, it is sometimes desired to prepare relatively soft uncured rubber compositions for various tire components, such as for example a high performance tire tread for which the rubber composition is mixed in an internal rubber mixer in which considerably reduced shear mixing conditions are used or experienced. In such case, the carbon black pellets might be inefficiently or even incompletely fragmented, or disintegrated, in situ within the rubber composition. This can result in a relatively poor carbon black dispersion within the elastomer host which may consequently lead to relatively poor various cured rubber physical properties for the rubber composition itself such as for example a relatively poor abrasion resistance. In such case, it may be desirable to provide the carbon black pellets with a reduced hardness, particularly where the carbon black pellets are to be fragmented in situ within the elastomer host in the presence of precipitated silica and silica coupler.

Accordingly, it is desired herein to prepare rubber compositions which contain a combination of precipitated silica, silica coupler and fragmented rubber reinforcing carbon black pellets by use of pelletized rubber reinforcing carbon black of a controlled hardness.

In the description of this invention, the term "phr" relates to parts by weight of an ingredient per 100 parts by weight of rubber.

The terms "rubber" and "elastomer" may be used interchangeably unless otherwise indicated.

The term "fluffy" rubber reinforcing carbon black aggregates, where used herein, means such fluffy carbon black aggregates in an uncompacted form, typically with an apparent density in range, for example, of from about 100 to about 250 kg/m$^3$.

The term "apparent density" where used herein means the ratio of the carbon black weight that fills a volume of one cubic meter (m$^3$) according to ASTM D1513 Test Method for Carbon Black Pellet Pour Density.

The term "specific gravity" if used herein means the true carbon black material specific gravity according to ASTM D792-55 Test Method.

DISCLOSURE AND PRACTICE OF THE INVENTION

In accordance with this invention, a rubber composition is provided which is comprised of, based upon parts by weight per 100 parts by weight rubber (phr):
(A) at least one conjugated diene-based elastomer (100 phr);
(B) about 20 to about 120, alternately about 40 to about 80, phr of reinforcing filler comprised of:
  (1) about 10 to about 110, alternately about 20 to about 60 phr of precipitated silica (typically aggregates of primary silica particles), and
  (2) about 10 to about 110, alternately about 20 to about 60, phr of carbon black pellets (pellets of rubber reinforcing carbon black), and
(C) a coupling agent for said precipitated silica having a moiety reactive with hydroxyl groups contained on the surface of said precipitated silica and another different moiety interactive with said conjugated diene based elastomer(s);
wherein said carbon black pellets are composites comprised of rubber reinforcing carbon black (particles) and an organic binder (for the rubber reinforcing carbon black particles);
  wherein said rubber reinforcing carbon black pellets have a hardness value (ASTM D3313-88) in a range of from about 10 to about 40, alternately from about 20 to about 35.

In practice, said rubber reinforcing carbon black preferably has an Iodine value (ASTM D1510) in a range of from about 20 to about 200 g/kg and a DBP (dibutyl phthalate) value (ASTM D2414) in a range of from about 50 to about 200 cc/100 g.

In further accordance with this invention said rubber composition contains said carbon black pellets as being disintegrated into fragments thereof.

In further accordance with this invention, a process of preparing a rubber composition comprises a high shear mixing of said rubber composition in an internal rubber mixer to cause said carbon black pellets to disintegrate into fragments thereof in situ and in the presence of said precipitated silica and silica coupling agent to form a dispersion of said fragmented carbon black pellets throughout said rubber composition;
wherein said coupling agent reacts with hydroxyl groups in said precipitated silica during said in situ disintegration of said carbon black pellets.

In additional accordance with this invention, a tire is provided having a component comprised of said rubber composition.

In further accordance with this invention said component of said tire is a tire tread with a running surface (intended for ground contacting by the tire).

In practice, said carbon black pellets are comprised of said rubber reinforcing carbon black aggregates and said organic binder therefor to achieve said controlled hardness values for said carbon black pellets.

A significant aspect of this invention is the reinforcement of a conjugated diene-based elastomer with a combination of carbon black pellets of controlled hardness with a precipitated silica together with a silica coupling agent where the carbon black pellets are disintegrated by high shear mixing in situ within said conjugated diene-based elastomer host and in the presence of the precipitated silica particles and silica coupler which is preferentially reactive with hydroxyl groups on the precipitated silica during the disintegration, or fragmentation, of the carbon black pellets within the elastomer host.

In one aspect, it has been observed that abrasion resistance of the elastomer composition may be improved, thus indicating an improved dispersion or possibly an improved affinity of the elastomer for one or both of the fragmented carbon black or precipitated silica or combination of precipitated silica and silica coupling agent as it reacts with hydroxyl groups on the precipitated silica, all in situ within the elastomer host.

In practice, representative of various conjugated diene-based elastomers are polymers and copolymers of at least one of isoprene and 1,3-butadiene and copolymers of styrene and at least one of isoprene and 1,3-butadiene and their mixtures. Representative elastomers are, for example, elastomers comprised of natural cis 1,4-polyisoprene rubber, synthetic cis 1,4-polyisoprene rubber, cis 1,4-polybutadiene rubber, styrene/butadiene copolymer rubber and high vinyl polybutadiene rubber having a vinyl content in a range of from about 30 to about 90 percent (of its microstructure) and their mixtures. Preferably, said conjugated diene-based elastomer is comprised of cis 1,4-polyisoprene rubber.

In practice, representative examples of various rubber reinforcing carbon blacks are reported in *The Vanderbilt Rubber Handbook*, 13th Edition, 1990, Page 417. It is to be appreciated that reported carbon blacks are in a pelletized form using classical binders.

In practice, said coupling agent for said silica may be, for example,
(A) a bis-(3-triakloxysilylalkyl)polysulfide such as, for example, a bis-(3-triethoxysilylpropyl)polysulfide, having an average of from 2 to about 4 and more preferably an average of from 2 to about 2.6 or from about 3.4 to about 4, connecting sulfur atoms in its polysulfidic bridge,
(B) a bis-(3-triethoxysilylpropyl)polysulfide having an average of from about 2 to about 2.6 connecting sulfur atoms in its polysulfidic bridge or a bis-(3-triethoxysilylpropyl)

polysulfide having an average of from about 3.4 to about 4 connecting sulfur atoms in its polysulfidic bridge, wherein said polysulfide having an average of from 2 to about 2.6 connecting sulfur atoms in its polysulfidic bridge (to the exclusion of such polysulfide having an average of from 3 to 4 connecting sulfur atoms in its polysulfidic bridge) is blended with said rubber composition in the absence of sulfur and sulfur vulcanization accelerator and wherein said polysulfide having an average of from about 3.4 to about 4 connecting sulfur atoms in its polysulfidic bridge is thereafter blended with said rubber composition in the presence of sulfur and at least one sulfur vulcanization accelerator, (C) an organoalkoxymercaptosilane composition of the general Formula (I) represented as:

$(X)_n(R_7O)_{3-n}\text{—Si—}R_8\text{—SH}$      (I)

wherein X is a radical selected from a halogen, namely chlorine or bromine and preferably a chlorine radical, and from alkyl radicals having from one to 16, preferably from one through 4, carbon atoms, preferably selected from methyl, ethyl, propyl (e.g. n-propyl) and butyl (e.g. n-butyl) radicals; wherein $R_7$ is an alkyl radical having from 1 through 18, alternately 1 through 4, carbon atoms preferably selected from methyl and ethyl radicals and more preferably an ethyl radical; wherein $R_8$ is an alkylene radical having from one to 16, preferably from one through 4, carbon atoms, preferably a propylene radical; and n is an average value of from zero through 3, preferably zero, and wherein, in such cases where n is zero or 1, $R_7$ may be the same or different for each ($R_7$O) moiety in the composition, or (D) said organoalkoxymercaptosilane of the general Formula (I) having its mercapto moiety capped with a moiety which uncaps the mercapato moiety of the organoalkoxymercaptosilane in the presence of an amine.

Representative examples of various organoalkoxymercaptosilanes are, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, tripropoxy mercaptopropyl silane, ethoxy dimethoxy mercaptopropylsilane, ethoxy diisopropoxy mercaptopropylsilane, ethoxy didodecyloxy mercaptopropylsilane and ethoxy dihexadecyloxy mercaptopropylsilane.

Such organoalkoxymercaptosilanes may be capped with various moieties as discussed above.

A representative example of a capped organoalkoxymercaptosilane coupling agent is a liquid 3-octanoylthio-1-propyltriethoxysilane as NXT™ Silane from the GE Silicones Company.

The coupling agent may, for example, be added directly to the elastomer mixture or may be added as a composite of precipitated silica and such coupling agent formed by treating a precipitated silica therewith or by treating a colloidal silica therewith and precipitating the resulting composite.

In practice, representative of various precipitated silicas are synthetic amorphous precipitated silicas such as, for example, and not intended herein to be limitive, HiSil 546™ and HiSil 532™ from PPG Industries, Hubersil 4155™ from the J. M. Huber Company and Ultrasil™ VN2 and VN3 from the Degussa Company.

In practice, the precipitated silica, or at least a portion of the precipitated silica, may be pre-treated prior to addition to said elastomer(s):

(A) with an alkylsilane of the general Formula (II), or
(B) with said bis(3-triethoxysilylpropyl)polysulfide having an average of from about 2 to about 4 connecting sulfur atoms in its polysulfidic bridge, or
(C) with said organomercaptosilane of the general Formula (I), or
(D) with a combination of said alkylsilane of general Formula (II) and said bis(3-triethoxysilylpropyl)polysulfide having an average of from about 2 to about 4 connecting sulfur atoms in its polysulfidic bridge, or
(E) with a combination of said alkylsilane of general Formula (II) and said organomercaptosilane of general Formula (I);

wherein said alkylsilane of the general Formula (II) is represented as:

$X_n\text{—Si—}R_{6(4-n)}$      (II)

wherein $R_6$ is an alkyl radical having from 1 to 18 carbon atoms, preferably from 1 through 4 carbon atoms; n is a value of from 1 through 3; X is a radical selected from the group consisting of halogens, preferably chlorine, and alkoxy groups selected from methoxy and ethoxy groups, preferably an ethoxy group.

Therefore, in practice, for example, said coupling agent may be added directly to the elastomer mixture or added as a composite of precipitated silica and said coupling agent, and optionally an alkylsilane of said general Formula (II), formed by treating a precipitated silica therewith.

In practice, said precipitated silica may be comprised of:
(A) a synthetic amorphous precipitated silica,
(B) a pre-hydrophobated precipitated silica, or
(C) a combination of from about 5 to about 50 phr of pre-hydrophobated precipitated silica and from about 5 to about 50 phr of precipitated silica (non pre-hydrophobated precipitated silica);

wherein, said pre-hydrophobated precipitated silica may be pre-hydrophobated, for example, by treatment of a precipitated silica with, for example, an alkyl silane of said formula (II) and/or with a bis(3-trialkoxysilylalkyl)polysulfide having an average of from about 2 to about 4 sulfur atoms in its polysulfidic bridge), (e.g. a bis(3-triethoxysilylpropyl)polysulfide)).

The various rubber compositions may be prepared by blending the said pelletized composite of particulate carbon black aggregates of controlled hardness values with various sulfur vulcanizable elastomers and/or additional rubber compounding ingredients by methods generally known in the rubber compounding art, such as mixing in an internal rubber mixer with various commonly used additive materials such as, for example, curing aids, such as sulfur, activators, retarders and accelerators, processing additives, such as oils, resins including tackifying resins and plasticizers, fillers, pigments, fatty acid, zinc oxide, waxes, antioxidants and antiozonants and peptizing agents. Additional fillers can be used such as, for example, various clays and calcium carbonate.

As known to those skilled in the art, depending on the intended use of the sulfur vulcanizable and sulfur vulcanized material (rubbers), the additives mentioned above are selected and commonly used in conventional amounts.

Typical amounts of tackifier resins, if used, may comprise about 0.5 to about 10 phr, usually about 1 to about 5 phr. Typical amounts of processing aids may comprise 1 to 50 phr, if used. Such processing aids can include, for example, aromatic, naphthenic, and/or paraffinic processing oils. Typical amounts of antioxidants may comprise about 1 to about 3 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants may comprise about 1 to about 6 phr. Typical amounts of fatty acids which can include stearic acid comprise about 0.5 to about 3 phr. Typical amounts of zinc oxide may comprise about 2 to about 6 phr. Typical amounts of waxes may comprise about 1 to about 5 phr. Often microcrystalline waxes are used. Typical amounts of peptizers may comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents may used, for example, in an amount ranging from about 0.5 to about 6 phr, with a range of from about 1 to about 3 often being preferred.

Accelerators, including primary and optionally secondary accelerators, are used to control the time and/or temperature required for vulcanization and to improve the properties of the vulcanizate. Often accelerators are used in an amount ranging, for example, from about 0.5 to about 3 phr. Such accelerators may be, for example, various amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

Sometimes a combination of antioxidants, antiozonants and waxes may be collectively referred to as "antidegradants".

The presence and relative amounts of the various rubber compounding ingredients are not necessarily considered to be an aspect of this invention, except where indicated.

EXAMPLE I

Rubber samples were prepared based on a synthetic cis 1,4-polyisoprene rubber composition containing carbon black pellets of varying hardness values.

The basic rubber recipe is illustrated in the following Table I.

The synthetic cis 1,4-polyisoprene rubber compositions were prepared by mixing ingredients, which included the synthetic cis 1,4-polyisoprene rubber, in an internal rubber mixer. The ingredients are mixed in a sequential series of two non-productive (NP) steps, each to a temperature of about 160° C., followed by a productive (P) mixing step to a temperature of about 110° C. in which sulfur and sulfur cure vulcanization accelerator are mixed therewith. Preparation of rubber composition by mixing in a sequential series of non-productive (NP) and productive (P) mixing steps is well known by those having skill in such art.

TABLE 1

| Material | Parts |
|---|---|
| First Non-Productive (NP-1) Mixing Step (to about 160° C.) | |
| Synthetic cis 1,4-polyisoprene rubber[1] | 100 |
| Carbon black (carbon black pellets or fluffy carbon black)[2] | 50 |
| Rubber processing oil[3] | 8 |
| Fatty acid[4] | 2 |
| Antioxidant[5] | 2 |
| Zinc oxide | 5 |
| Second Non-Productive (NP-2) Mixing Step (to about 160° C.) | |
| No ingredients added | |
| Productive (P) Mixing Step (to about 110° C.) | |
| Sulfur | 1.4 |
| Accelerator | 1 |

[1]Synthetic cis 1,4-polyisoprene rubber as NAT2200 ™ from The Goodyear Tire & Rubber Company
[2]Carbon black as N320, an ASTM designation, with an Iodine value (ASTM D1510) of about 82 g/kg and a DBP value (ASTM D2414) of about 102 cc/100 g which may be in a form of fluffy (unpelletized) carbon black or composites of carbon black pellets and binder of varying hardness values
[3]Rubber processing oil as Flexon 641 ™ from the ExxonMobil Company
[4]Stearic acid as a blend comprised of stearic, palmitic and oleic acids
[5]Quinoline type
[6]Tertary butyl sulfenamide The carbon black pellets of various pellet hardness values used for these Examples are reported in the following Table 2 as used in rubber Samples A through G of the following Table 2. Sample H used fluffy carbon black instead of carbon black pellet composites. The hardness values for the carbon black pellets may be measured by ASTM D3313-88.

Accordingly, in the following Table 2 various physical properties are reported for samples of the synthetic cis 1,4-polyisoprene rubber compositions in which pelletized carbon blacks comprised of rubber reinforcing carbon black aggregates and organic binder are used of varying pellet hardness values for Samples A through G and the fluffy carbon black is sued for Sample H.

As shown in Table 2, the hardness values of the carbon pellets (average value) ranged from a value of 19 (Sample G) to a more typical value of 57 (Sample A).

TABLE 2

| Physical Properties | Rubber Samples | | | | | | | |
|---|---|---|---|---|---|---|---|---|
| | A | B | C | D | E | F | G | H |
| Carbon black pellet hardness | 57 | 55 | 41 | 36 | 27 | 24 | 19 | Fluffy black |
| Rheometer, 150° C. | | | | | | | | |
| Maximum torque (dNm) | 15.45 | 15.7 | 15.71 | 15.51 | 15.58 | 15.43 | 16.04 | 15.81 |

TABLE 2-continued

| Physical Properties | Rubber Samples | | | | | | | |
|---|---|---|---|---|---|---|---|---|
| | A | B | C | D | E | F | G | H |
| Minimum torque (dNm) | 2.78 | 2.71 | 2.73 | 2.79 | 2.71 | 2.68 | 2.74 | 2.69 |
| Delta torque (dNm) | 12.67 | 12.99 | 12.98 | 12.72 | 12.87 | 12.75 | 13.3 | 13.12 |
| T90, minutes | 13.2 | 12.6 | 12.2 | 13.3 | 12.7 | 11.6 | 13 | 12 |
| Stress Strain, | | | | | | | | |
| Tensile strength (MPa) | 21.1 | 22.3 | 22.4 | 21.6 | 22.5 | 22.3 | 21.4 | 22.4 |
| Elongation at break (%) | 536 | 508 | 518 | 531 | 520 | 517 | 508 | 513 |
| 300% modulus (MPa) | 9.33 | 10.66 | 10.48 | 9.73 | 10.49 | 10.43 | 10.33 | 10.72 |
| Rebound | | | | | | | | |
| 23° C. | 50 | 50 | 50 | 49 | 50 | 50 | 49 | 50 |
| 100° C. | 66 | 67 | 68 | 65 | 68 | 68 | 66 | 68 |
| Hardness, Shore A (ASTM D1415) | | | | | | | | |
| 23° C. | 62 | 61 | 61 | 62 | 62 | 62 | 63 | 62 |
| 95° C. | 57 | 56 | 56 | 56 | 57 | 57 | 57 | 57 |
| Tear Strength[1] | | | | | | | | |
| 23° C., N | 434 | 475 | 457 | 526 | 501 | 516 | 464 | 363 |
| 95° C., N | 142 | 130 | 103 | 136 | 112 | 115 | 113 | 112 |
| DIN abrasion resistance (2.5 N) relative cc loss[2] | | | | | | | | |
| Relative vol. loss, cc | 113 | 115 | 123 | 118 | 120 | 126 | 113 | 120 |
| RPA, 150° C. 10% strain, 1 Hz[3] | | | | | | | | |
| Storage modulus, G' kPa | 1239 | 1221 | 1225 | 1220 | 1214 | 1201 | 1252 | 1230 |
| Tan delta | .099 | .091 | .092 | .099 | .091 | .095 | .097 | .092 |

[1]Data obtained according to a peel strength adhesion (tear strength) test to determine interfacial adhesion between two samples of a rubber composition.
In particular, such interfacial adhesion is determined by pulling one rubber composition away from the other at a right angle to the untorn test specimen with the two ends of the rubber compositions being pulled apart at a 180° angle to each other using an Instron instrument
[2]DIN abrasion (relative to a control), DIN 53516
[3]Data obtained according to Rubber Process Analyzer as RPA 2000 ™ instrument by Alpha Technologies, formerly the Flexsys Company and formerly the Monsanto Company. References to an RPA-2000 instrument may be found in the following publications: H. A. Palowski, et al, Rubber World, June 1992 and January 1997, as well as Rubber & Plastics News, Apr. 26 and May 10, 1993.

It can be seen from Table 2 that the cured physical properties of the rubber Samples, with an exception of the tear strength at 23° C., were somewhat unaffected by the indicated hardness values of the carbon black pellets.

Noticeably, the tear strength at 23° C. shows beneficially maximum values for Rubber Samples D, E and F (values of from 501 to 526 Newtons) for a carbon black pellet hardness value range of from about 24 to about 36.

EXAMPLE II

Additional rubber samples were prepared based on a synthetic cis 1,4-polyisoprene rubber composition prepared by high shear blending of a combination of particulate precipitated silica and carbon black pellets of varying hardness values, or fluffy carbon black, together with a silica coupling agent, wherein the carbon black pellets are fragmented in situ within the cis 1,4-polyisoprene rubber in the presence of the precipitated silica and silica coupler which is reactive with hydroxyl groups contained on the precipitated silica.

The basic recipe for the rubber samples is shown in the following Table 3.

The rubber compositions were prepared by mixing ingredients, including the cis 1,4-polyisoprene rubber, in an internal rubber mixer. The ingredients are mixed in a sequential series of two non-productive (NP) steps, each to a temperature of about 160° C., followed by a productive (P) mixing step to a temperature of about 110° C. in which sulfur and sulfur cure vulcanization accelerator are mixed therewith. The rubber compositions were allowed to cool below 40° C. between mixing steps. Preparation of rubber compositions by mixing in a sequential series of non-productive (NP) and productive (P) mixing steps is well known by those having skill in such art.

TABLE 3

| Material | Parts |
|---|---|
| First Non-Productive (NP-1) Mixing Step (to about 160° C.) | |
| Synthetic cis 1,4-polyisoprene rubber[1] | 100 |
| Carbon black pellets or fluffy carbon black[2] | 20 |
| Rubber processing oil[3] | 6 |
| Fatty acid[4] | 2 |
| Antioxidant[5] | 2 |
| Zinc oxide | 5 |
| Silica[6] | 15 |
| Silica coupling agent[7] | 3 |
| Second Non-Productive (NP-2) Mixing Step (to about 160° C.) | |
| First non-productive | 153 |
| Silica[6] | 15 |
| Silica coupling agent[7] | 2 |
| Rubber processing oil[3] | 1 |
| Productive (P) Mixing Step (to about 110° C.) | |
| Second non-productive (NP-2) rubber composition | 171 |
| Sulfur | 1.4 |
| Accelerator 1[8] | 1.7 |
| Accelerator 2[9] | 0.5 |

[1]Synthetic cis 1,4-polyisoprene rubber as NAT2200 ™ from The Goodyear Tire & Rubber Company TABLE 3-continued

| Material | Parts |
|---|---|

[2]Carbon black as N320, an ASTM designation, in a form of carbon black pellet composites with an organic binder for the carbon black with various pellet hardness values as shown in Table 2, or fluffy carbon black not in pellet form, with an Iodine value (ASTM D1510) of about 82 g/kg and a DBP value (ASTM D2414) of about 102 cc/100 g
[3]Rubber processing oil as Flexon 641 ™ from the ExxonMobil Company
[4]Stearic acid as a blend comprised of stearic, palmitic and oleic acids
[5]Quinoline type
[6]Precipitated silica as HiSil 210 ™ from PPG Industries
[7]A composite of silica coupling agent as Si266 ™ from Degussa as a composite of bis(3-triethoxysilylpropyl)polysulfide having an average of connecting sulfur atoms of from about 2.2 to about 2.6 in its polysulfidic bridge in a 50/50 ratio thereof and carbon black and reported in Table 3 as the composite
[8,9]Tertiary butyl sulfenamide and diphenyl guanidine In the following Table 4 various physical properties are reported for samples of the synthetic cis 1,4-polyisoprene rubber compositions which contain fluffy carbon black aggregates or the aforesaid carbon black pellets of varying hardness values in combination with precipitated silica reinforcement. The rubber samples are reported as Samples I through P. The carbon black used in Samples I through O, as in Samples A through G of Example I is the pelletized carbon black and the carbon black used in Sample P, as in Sample H of Example I, is a fluffy, non-pelletized carbon black.

As shown in Table 4, the hardness values of the carbon black pellets (average value) ranged from a value of 19 (Sample O) to a more typical value of 57 (Sample I).

It can be seen from Table 4 that the cured physical properties of the rubber Samples, with an exception of the tear strength and the DIN abrasion resistance were relatively unaffected by the indicated hardnesses of the carbon black pellets.

The tear strengths of rubber Samples J, K, L and N at both 23° C. and 95° C. are observed to be somewhat negatively affected by the hardness of the carbon black pellets with hardnesses of 55, 31, 36 and 24, respectively as compared to rubber Sample I where a pellet having a hardness value of 57 was used.

However, rubber Sample M exhibited significantly better tear strength values at both 23° C. and 95° C. where carbon black pellets having a hardness of 27 was used. Accordingly, it is considered herein that the carbon black pellets having such hardness of 27 was apparently beneficial for the rubber composition insofar as the indicated tear resistance property is concerned.

The DIN abrasion resistance values showed the best performance (greater abrasion resistance) for rubber Samples M and N where carbon black pellets were used having hardnesses of 24 and 27, respectively.

Accordingly, it is concluded herein that an optimum abrasion resistance can be obtained by controlling the carbon black pellet hardness value to a value in a range of from about 10 to about 40 with a more optimum range of from about 20 to about 35 as a viable practical alternative to using and handling dusty fluffy carbon black in the workplace.

While certain representative embodiments and details have been shown for the purpose of illustrating the invention, it will be apparent to those skilled in this art that various

TABLE 4

| | Rubber Samples | | | | | | | |
|---|---|---|---|---|---|---|---|---|
| Physical Properties | I | J | K | L | M | N | O | P |
| Carbon black hardness | 57 | 55 | 41 | 36 | 27 | 24 | 19 | Fluffy black |
| Rheometer. 150° C. (MDR) | | | | | | | | |
| Maximum torque (dNm) | 18.17 | 18.47 | 18.54 | 18.37 | 17.8 | 18.18 | 18.51 | 17.79 |
| Minimum torque (dNm) | 2.65 | 2.62 | 2.57 | 2.6 | 2.47 | 2.52 | 2.67 | 2.28 |
| Delta torque (dNm) | 15.52 | 15.85 | 15.97 | 15.77 | 15.33 | 15.66 | 15.84 | 15.51 |
| T90, minutes | 14.2 | 13.5 | 13.8 | 14.3 | 14.1 | 13.4 | 14 | 14.4 |
| Stress Strain, (ATS) | | | | | | | | |
| Tensile strength (MPa) | 21.1 | 23.2 | 20.9 | 21.5 | 22.3 | 20.9 | 22.2 | 21.1 |
| Elongation at break (%) | 534 | 564 | 514 | 539 | 537 | 513 | 539 | 517 |
| 300% modulus (MPa) | 9.6 | 10.5 | 10.2 | 9.7 | 10.2 | 10.3 | 10.1 | 10.2 |
| Rebound | | | | | | | | |
| 23° C. | 54 | 52 | 54 | 54 | 53 | 54 | 54 | 54 |
| 100° C. | 69 | 67 | 69 | 68 | 68 | 69 | 69 | 69 |
| Hardness, Shore A | | | | | | | | |
| 23° C. | 64 | 64 | 64 | 63 | 64 | 64 | 65 | 65 |
| 95° C. | 62 | 61 | 62 | 61 | 62 | 63 | 63 | 63 |
| Tear Strength | | | | | | | | |
| 23° C. | 385 | 360 | 367 | 350 | 402 | 308 | 291 | 291 |
| 95° C. | 102 | 112 | 99 | 80 | 124 | 67 | 52 | 51 |
| DIN abrasion resistance (2.5 N) relative cc loss[2] | | | | | | | | |
| Relative vol. loss, cc | 165 | 142 | 137 | 140 | 124 | 123 | 134 | 136 |
| RPA. 150° C. 10% strain, 1 Hz[4] | | | | | | | | |
| Storage modulus, G', kPa | 1553 | 1540 | 1558 | 1549 | 1520 | 1556 | 1568 | 1517 |
| Tan delta | .083 | .079 | .077 | .083 | .076 | .077 | .084 | .075 | changes and modifications may be made therein without departing from the spirit or scope of the invention.

What is claimed is:

1. A tire having a tread of a rubber composition comprised of, based upon parts by weight per 100 parts by weight rubber (phr):
   (A) at least one conjugated diene-based elastomer (100 phr);
   (B) about 20 to about 120 phr of reinforcing filler comprised of:
      (1) about 10 to about 110 phr of precipitated silica,
      (2) about 10 to about 110 phr of carbon black pellets, and
   (C) a coupling agent for said precipitated silica having a moiety reactive with hydroxyl groups contained on the surface of said precipitated silica and another different moiety interactive with said conjugated diene based elastomer(s);
   wherein said carbon black pellets are composites comprised of rubber reinforcing carbon black and an organic binder;
   wherein said carbon black pellets have a hardness value (ASTM D3313-88) in a range of from about 20 to about 35,
   wherein said rubber reinforcing carbon black has an Iodine value (ASTM D1510) in a range of from about 20 to about 200 g/kg and a DBP (dibutyl phthalate) value (ASTM D2414) in a range of from about 50 to about 200 cc/100 g, and
   wherein said conjugated diene-based elastomer is selected from polymers and copolymers of at least one of isoprene and 1,3-butadiene and copolymers of styrene and at least one of isoprene and 1,3-butadiene, and their mixtures.

2. The tire of claim 1 wherein said carbon black pellets are in a form of disintegrated fragments thereof.

* * * * *